(12) United States Patent
Imanishi et al.

(10) Patent No.: US 7,303,503 B2
(45) Date of Patent: Dec. 4, 2007

(54) TOROIDAL-TYPE CONTINUOUSLY VARIABLE TRANSMISSION

(75) Inventors: Takashi Imanishi, Kanagawa (JP); Eiji Inoue, Kanagawa (JP)

(73) Assignee: NSK Ltd., Tokyo (JP)

( * ) Notice: Subject to any disclaimer, the term of this patent is extended or adjusted under 35 U.S.C. 154(b) by 395 days.

(21) Appl. No.: 10/631,864

(22) Filed: Aug. 1, 2003

(65) Prior Publication Data

US 2004/0092359 A1 May 13, 2004

(30) Foreign Application Priority Data

Aug. 2, 2002 (JP) .......................... P.2002-225529

(51) Int. Cl.
*F16H 15/38* (2006.01)
(52) U.S. Cl. .......................... 476/10; 476/40
(58) Field of Classification Search .................. 476/10, 476/40, 42, 46
See application file for complete search history.

(56) References Cited

U.S. PATENT DOCUMENTS

| | | | |
|---|---|---|---|
| 5,090,951 A * | 2/1992 | Greenwood | 475/216 |
| 5,888,160 A | 3/1999 | Miyata et al. | |
| 5,938,557 A * | 8/1999 | Greenwood | 475/216 |
| 6,171,210 B1 | 1/2001 | Miyata et al. | |
| 6,626,793 B1 * | 9/2003 | Greenwood | 476/10 |
| 2004/0171456 A1 * | 9/2004 | Greenwood et al. | 476/10 |

FOREIGN PATENT DOCUMENTS

| | | |
|---|---|---|
| JP | 1-169169 A | 7/1989 |
| JP | 1-312266 A | 12/1989 |
| JP | 6-72652 A | 9/1994 |
| JP | 10-196759 A | 7/1998 |
| JP | 10-281269 A | 10/1998 |
| JP | 11-63146 A | 3/1999 |
| JP | 2000-65193 A | 3/2000 |

OTHER PUBLICATIONS

Imanishi et al., "Development of POWERTOROS Unit Half-Toroidal CVT (2)", *NSK Technical Journal—Motion & Control*, No. 10, pp. 1-8, Apr. 2001.

* cited by examiner

*Primary Examiner*—William C. Joyce
(74) *Attorney, Agent, or Firm*—Sughrue Mion, PLLC (57) ABSTRACT

A toroidal-type continuously variable transmission, has first and second disks respectively including inner surfaces; power rollers interposed for transmitting power; a pressing device for pressing the first disk toward the second disk; a main oil pressure control unit for non-electrically detecting the power for setting, as a target value, an oil pressure necessary for the pressing device when a transmission ratio between the first and second disks is a transmission ratio requiring a maximum pressing force, and increase the target value as the pressing force increases; an oil pressure correcting apparatus for electrically finding a necessary value of the oil pressure, the necessary value corresponding to the optimum value of pressing force generated by the pressing device, and also for introducing an oil pressure of a value into the pressing device, the oil pressure of the value being obtained by subtracting a correction value from the target value.

6 Claims, 6 Drawing Sheets

TOROIDAL-TYPE CONTINUOUSLY VARIABLE TRANSMISSION

BACKGROUND OF THE INVENTION

1. Field of the Invention

A toroidal-type continuously variable transmission according to the invention is used as transmission unit constituting an automatic transmission for a car, or, as a transmission apparatus for adjusting the operating speed of various industrial machines such as a pump.

2. Description of the Related Art

Figure 4:
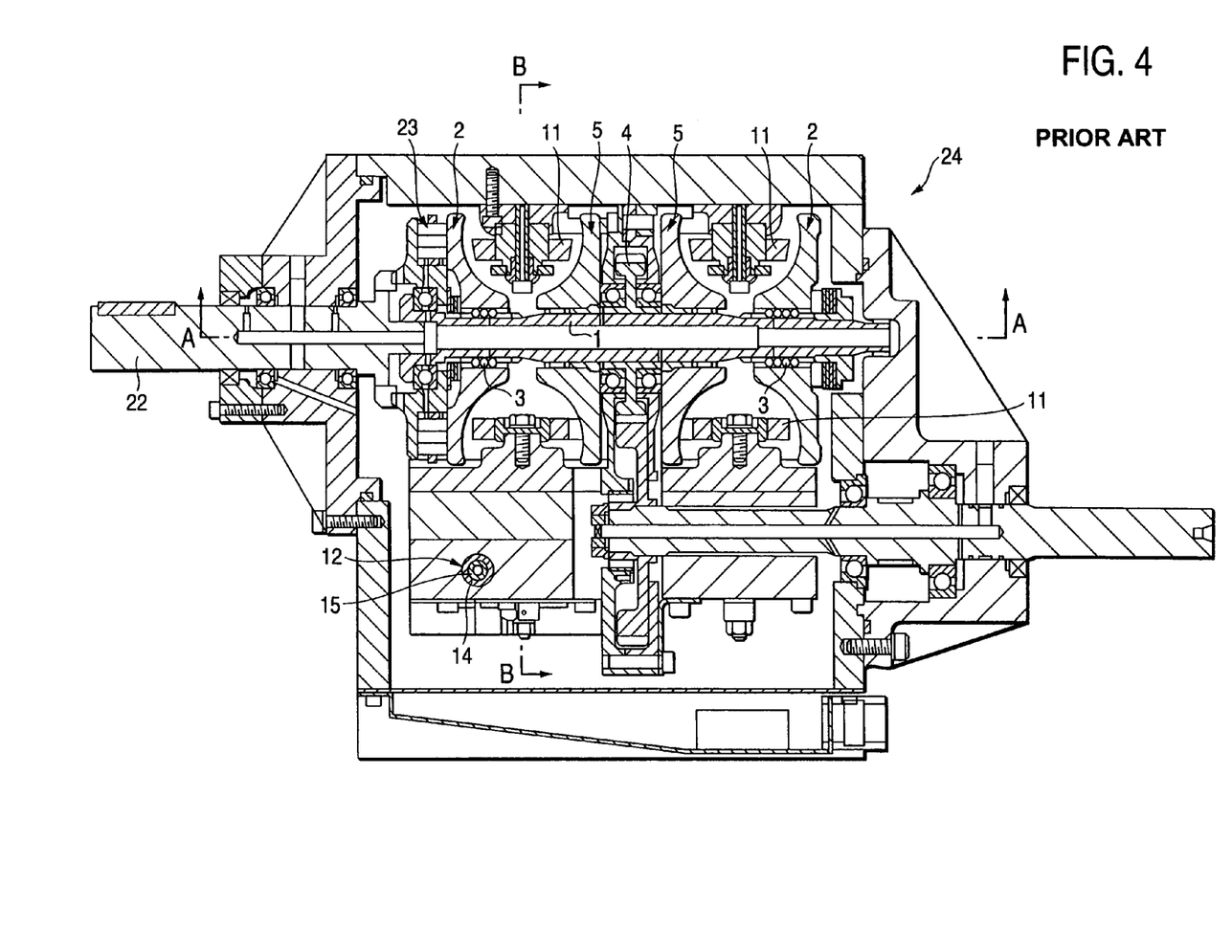
FIG. 4 is a section view of an example of a conventional toroidal-type continuously variable transmission.
Figure 5:
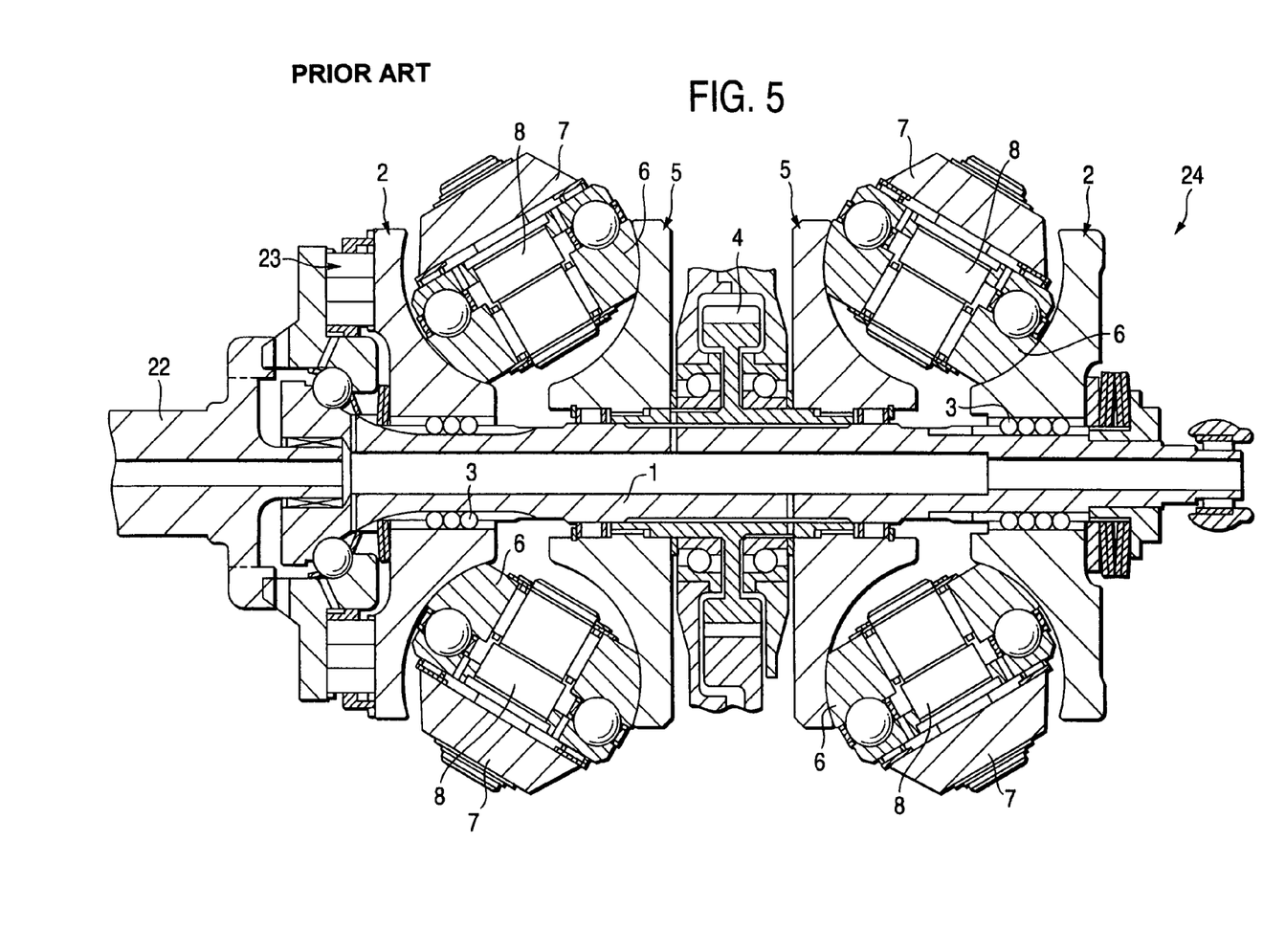
FIG. 5 is a section view taken along the line A-A shown in FIG. 4.
Figure 6:
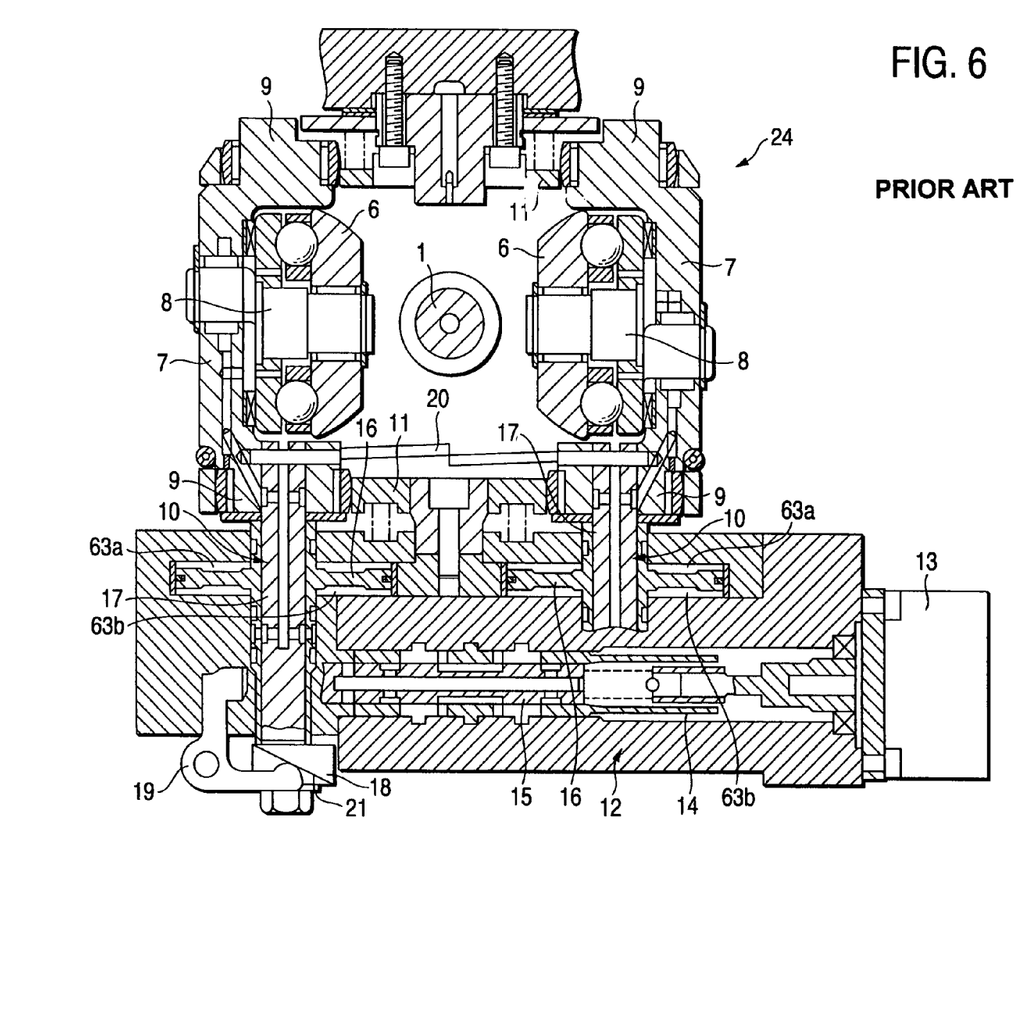
FIG. 6 is a section view taken along the line B-B shown in FIG. 4.

Conventionally, to use such a toroidal-type continuously variation transmission as shown in FIGS. 4 to 6 as an automatic transmission apparatus for a car has been studied and such use has been enforced in part of the car industry. A toroidal-type continuously variable transmission of this type is referred to as a toroidal-type continuously variable transmission of a double cavity type, in which input side disks 2, 2 serving as first disks are supported through their respective ball splines 3, 3 on the peripheries of the two end portions of an input shaft 1. Therefore, these two input side disks 2, 2 are supported in such a manner that they are concentric with each other and can be rotated in synchronization with each other. Also, an output gear 4 is supported on the periphery of the middle portion of the input shaft 1 in such a manner that it can be rotated with respect to the input shaft 1. And, output side disks 5, 5 serving as second disks are respectively spline engaged with the two end portions of a cylindrical portion disposed in the central portion of the output gear 4. Therefore, the two output side disks 5, 5 can be rotated together with the output gear 4 in synchronization with each other.

Also, respectively between the mutually associated input side disks 2, 2 and output side disks 5, 5, there are held a plurality of (normally, 2 to 3) power rollers 6, 6. The power rollers 6, 6 are respectively supported on the inner surfaces of trunnions serving as support members through support shafts 8, 8 and a plurality of rolling bearings in such a manner that they can be rotated. The trunnions 7, 7 can be respectively swung and shifted about their associated pivot shafts 9, 9 which are disposed on the two end portions of the trunnions 7, 7 in their respective longitudinal directions (in FIGS. 4, 6, in the upward and downward directions; and, in FIG. 5, in the front and back directions) in such a manner that the pivot shafts 9, 9 are concentric with each other. An operation to incline the respective trunnions 7, 7 is carried out by shifting the trunnions 7, 7 in the axial directions of the pivot shafts 9, 9 using actuators 10, 10 each of an oil pressure type; and, the inclination angles of all of the trunnions are synchronized with each other in an oil pressure manner and in a mechanical manner.

That is, in case where the inclination angles of the trunnions 7, 7 are changed in order to change a transmission ratio between the input shaft 1 and output gear 4, the trunnions 7, 7 are respectively shifted in the mutually opposite directions, using their associated actuators 10, 10; for example, the power roller 6 situated on the right side in FIG. 6 is shifted to the lower side in FIG. 6 and the power roller 6 on the left side in FIG. 6 is shifted to the upper side in FIG. 6. This changes the directions of forces going in the tangential direction which respectively act on the contact portions between the peripheral surfaces of the power rollers 6, 6 and the inner surfaces of the input side disks 2, 2 and output side disks 5, 5 (that is, side-slip occurs in the contact portions). And, with such change in the directions of the tangential-direction forces, the trunnions 7, 7 are swung (inclined) in the mutually opposite directions about the pivot shafts 9, 9 which are pivotally supported on their associated support plates 11, 11. As a result of this, the contact positions between the peripheral surfaces of the power rollers 6, 6 and the inner surfaces of the input side and output side disks 2, 5 are caused to change, thereby changing the rotation transmission ratio between the input shaft 1 and output gear 4.

Supply of pressure oil to the above respective actuators 10, 10 is carried out using a single transmission ratio control valve 12 regardless of the number of these actuators 10, 10; and, the motion of any one of the trunnions 7, 7 is fed back to the transmission ratio control valve 12. The transmission ratio control valve 12 includes a sleeve 14 to be shifted in the axial direction (in FIG. 6, in the right and left direction; and, in FIG. 4, in the front and back direction) by a stepping motor 13, and a spool 15 fitted into the inside diameter side of the sleeve 14 in such a manner that it can be shifted in the axial direction. Also, of rods 17, 17 which connect together the trunnions 7, 7 and the pistons 16, 16 of the actuators 10, 10, to the end portion of the rod 17 which belongs to any one of the trunnions 7, 7, there is fixed a precess cam 18, thereby constituting a feedback mechanism which transmits the above-mentioned motion of the rod 17, that is, the composite value of the axial-direction shift amount and the rotation-direction amount to the spool 15 through the present precess cam 18 and a link arm 19. Also, a synchronizing cable 20 is set between the trunnions 7, 7, thereby being able to mechanically synchronize the inclination angles of the trunnions 7, 7 with each other even in case where an oil pressure system is out of order.

To switch over the transmission state, the sleeve 14 is shifted to a given position corresponding to a transmission ratio to be obtained by the stepping motor 13 to thereby open the given-direction flow passage of the transmission ratio control valve 12. As a result of this, the pressure oil is fed into the actuators 10, 10 in the given direction, so that these actuators 10, 10 shift the trunnions 7, 7 in the given direction. That is, as the pressure oil is fed, the trunnions 7, 7 not only are shifted in the axial direction of the pivot shafts 9, 9 but also are swung about these pivot shafts 9, 9. And, the motion (axial-direction shifting and swinging motion) of the above-mentioned one of the trunnions 7 is transmitted to the spool 15 through the precess cam 18 fixed to the end portion of the rod 17 and link arm 19, thereby shifting the spool 15 in the axial direction. As a result of this, in a state where the present trunnion 7 is shifted by a given amount, the flow passage of the transmission ratio control valve 12 is closed to thereby stop the supply of the pressure oil to the actuators 10, 10.

In this case, the motion of the transmission ratio control valve 12 based on the shifting motion of the trunnion 7 and the shifting motion of the cam surface 21 of the precess cam 18 is as follows. That is, firstly, in case where the trunnion 7 is shifted in the axial direction as the flow passage of the transmission ratio control valve 12 is opened, as described above, due to the side-slip which occurs in the contact portions between the peripheral surfaces of the power rollers 6 and the inner surfaces of the input side and output side disks 2, 5, the above trunnion 7 starts its shifting and swinging motion about its associated pivot shafts 9, 9. Also, with the axial-direction shifting motion of the trunnion 7, the shifting motion of the cam surface 21 is transmitted through the link arm 19 to the spool 15, so that the spool 15 is shifted in the axial direction to thereby change the switching state of the transmission ratio control valve 12. Specifically, the transmission ratio control valve 12 is switched into a direction in which the trunnion 7 is returned to the neutral position thereof by the actuator 10.

Therefore, the trunnion 7, just after it shifts in the axial direction, starts to shift in the opposite direction toward the neutral position. However, the trunnion 7 continues to swing about the pivot shafts 9, 9 as long as the shift thereof from the neutral position exists. As a result of this, the shift of the cam surface 21 of the precess cam 18 with respect to the circumferential direction is transmitted through the link arm 19 to the spool 15 to thereby shift the spool 15 in the axial direction. And, in a state where the inclination angle of the trunnion 7 reaches a given angle corresponding to a transmission ratio to be obtained, the trunnion 7 returns to the neutral position and, at the same time, the transmission ratio control valve 12 is closed, so that the supply of the pressure to the actuator 10 is stopped. As a result of this, the inclination angle of the trunnion 7 provides an angle corresponding to the amount by which the sleeve 14 has been shifted in the axial direction by the stepping motor 13.

The above-structured toroidal-type continuously variable transmission is in operation, one (in FIGS. 4 and 5, the left side) input side disk 2 is driven and rotated through such a pressing device 23 of a loading cam type or an oil pressure type as shown in FIGS. 4 and 5 by a drive shaft 22 which is connected to a drive source such as an engine. As a result of this, the pair of input side disks 2, 2 respectively supported on the two end portions of the input shaft 1 are rotated in synchronization with each other while they are pushed in their mutually approaching directions. And, these rotational movements are transmitted through the power rollers 6, 6 to the output side disks 5, 5 are then taken out from the output gear 4.

When transmitting the rotational movements from the input side disks 2, 2 to the output side disks 5, 5 in this manner, due to friction between the peripheral surfaces of the power rollers 6, 6 supported on the inner surfaces of the trunnions 7, 7 and the inner surfaces of the disks 2, 5, a force going in the axial direction of the pivot shafts 9, 9, which are disposed on the two end portions of the trunnions 7, 7, is applied to the trunnions 7, 7. This force is referred to as a so called 2Ft and the size of this force is proportional to the force (power) that is transmitted from the input side disks 2, 2 to the output side disks 5, 5 (or from the output side disks 5, 5 to the input side disks 2, 2). And, such force 2Ft is received by the actuators 10, 10. Therefore, when the toroidal-type continuously variable transmission is in operation, a pressure difference between a pair of oil pressure chambers respectively existing on the two sides of pistons 16, 16 constituting their associated actuators 10, 10 is proportional to the size of the force 2Ft.

Now, let us consider a case in which the rotation speed is changed between the input shaft 1 and output gear 4. Firstly, to reduce the speed between the input shaft 1 and output gear 4, the trunnions 7, 7 are respectively moved in the axial direction of the pivot shafts 9, 9 by the actuators 10, 10 and these trunnions 7, 7 are swung to such positions as shown in FIG. 5. And, the peripheral surfaces of the power rollers 6, 6 are respectively contacted with the near-to-center portions of the inner surfaces of the input side disks 2, 2 and the near-to-outer-periphery portions of the inner surfaces of the output side disks 5, 5 as shown in FIG. 5. On the other hand, to increase the rotation speed, the trunnions 7, 7 are swung in the opposite direction to FIG. 5 and the trunnions 7, 7 are respectively inclined in such a manner that the peripheral surfaces of the power rollers 6, 6, oppositely to the state shown in FIG. 5, are respectively contacted with the near-to-outer-periphery portions of the inner surfaces of the input side disks 2, 2 and the near-to-center portions of the inner surfaces of the output side disks 5, 5. In case where the inclination angles of these trunnions 7, 7 are set in the intermediate angles, there can be obtained an intermediate transmission ratio (a speed ratio) between the input shaft 1 and output gear 4.

Further, when a toroidal-type continuously variable transmission unit structured and operatable in the above-mentioned manner is actually assembled into a continuously variable transmission for a car, to construct a continuously variable transmission apparatus by combining the present toroidal-type continuously variable transmission unit with a planetary gear mechanism is conventionally proposed as disclosed in JP-A-1-169169, JP-A-1-312266, U.S. Pat. No. 5,888,160, U.S. Pat. No. 6,171,210 and the like.

Figure 7:
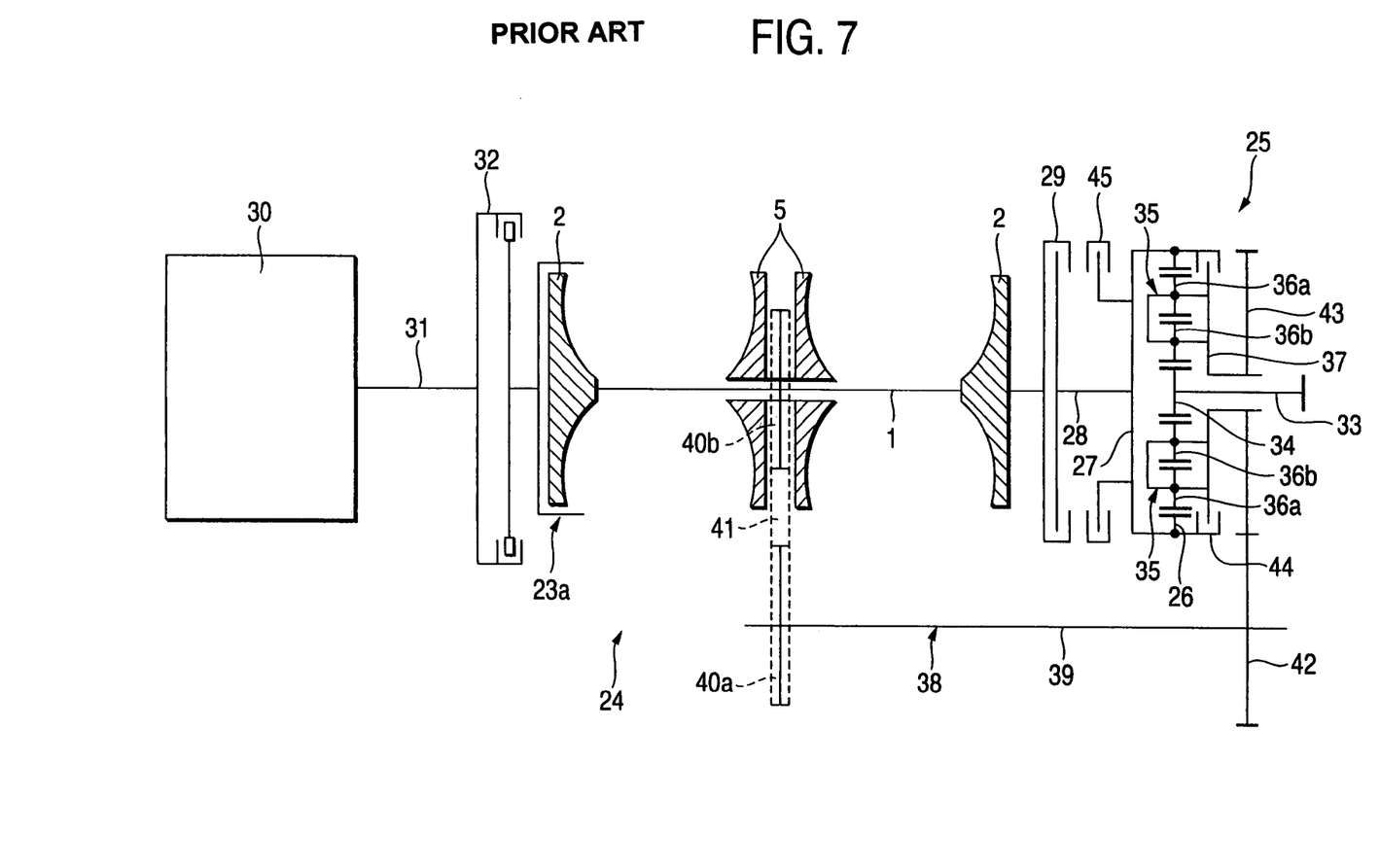
FIG. 7 is a schematic section view of an example of a conventional continuously variable transmission apparatus which is composed of a combination of a toroidal-type continuously variable transmission unit and a planetary-gear-type transmission unit.

Now, FIG. 7 shows a continuously variable transmission apparatus which is disclosed in U.S. Pat. No. 6,171,210 of the above-cited publications. This continuously variable transmission apparatus comprises a combination of a toroidal-type continuously variable transmission 24 of a double cavity type and a planetary-gear-type transmission 25. And, in the low speed running operation, the power is transmitted only by the toroidal-type continuously variable transmission 24; and, in the high speed running operation, the power is transmitted mainly by the planetary-gear-type transmission 25 and, at the same time, a speed ratio to be obtained by the planetary-gear-type transmission 25 can be adjusted freely by changing the speed ratio of the toroidal-type continuously variable transmission 24.

For the above purpose, the leading end portion (in FIG. 7, the right end portion) of an input shaft 1, which penetrates through the central portion of the toroidal-type continuously variable transmission 24 and also on the two end portions of which a pair of input side disks 2, 2 are supported, is connected through a high speed clutch 29 to a transmission shaft 28 which is fixed to the central portion of a support plate 27 supporting a ring gear 26 constituting the planetary-gear-type transmission 25. The structure of the toroidal-type continuously variable transmission 24 is substantially similar to the conventional structure previously shown in FIGS. 4 to 6, except for a pressing device 23a which will be described below.

Also, between the output side end portion (in FIG. 7, the right end portion) of a crankshaft 31 of an engine 30 serving as a drive source and the input side end portion (=base end portion=the left end portion in FIG. 7) of the input shaft 1, there are interposed a start clutch 32 and a pressing device 23a of an oil pressure type in such a manner that they are arranged in series to each other with respect to the transmission direction of the power. In the case of the continuously variable transmission apparatus disclosed in the above-cited U.S. Pat. No. 6,171,210, an arbitrary level of oil pressure can be introduced into the pressing device 23a.

An output shaft 33 used to take out the power based on the rotation of the input shaft 1 is disposed concentrically with the input shaft 1. And, on the periphery of the output shaft 33, there is disposed the planetary-gear-type transmission 25. A sun gear 34, which constitutes the planetary-gear-type transmission 25, is fixed to the input side end portion (in FIG. 7, the left end portion) of the output shaft 33. Therefore, the output shaft 33 can be rotated as the sun gear 34 is rotated on the periphery of the sun gear 34, there is supported the ring gear 26 in such a manner that it is concentric with the sun gear 34 and can be rotated. And, between the inner peripheral surface of the ring gear 26 and the outer peripheral surface of the sun gear 34, there are interposed a plurality of planetary gears 35, 35. Each of the planetary gears 35, 35 is composed of a pair of planetary gear elements 36a, 36b. These planetary gear elements 36a, 36b are meshingly engaged with each other; and, the planetary gear element 36a disposed on the outside diameter side is meshingly engaged with the ring gear 26, whereas the planetary gear element 36b disposed on the inside diameter side is meshingly engaged with the sun gear 34. The thus-structured planetary gears 35, 35 are rotatably supported on the one side surface (in FIG. 7, the left side surface) of a carrier 37. Also, the carrier 37 is rotatably supported on the intermediate portion of the output shaft 33.

Also, the carrier 37 is connected through a power transmission mechanism 38 to a pair of output side disks 5, 5, constituting the toroidal-type continuously variable transmission 24 in such a manner that the transmission of the rotational force between them is possible. The power transmission mechanism 38 comprises a transmission shaft 39 arranged in parallel to the input shaft 1 and output shaft 33, a sprocket 40a fixed to one end portion (in FIG. 7, the left end portion) of the transmission shaft 39, a sprocket 40b fixed to the output side disks 5, 5, a chain 41 set over and between the two sprockets 40a, 40b, and first and second gears 42, 43 which are respectively fixed to the other end portion (in FIG. 7, the right end portion) of the transmission shaft 39 and to the carrier 37 and also are meshingly engaged with each other. Therefore, the carrier 37, as the output side disks 5, 5 are rotated, can be rotated in the opposite direction to these output side disks 5, 5 at the speed that corresponds not only to the number of teeth of the first and second gears 42, 43 but also to the pair of sprockets 40a, 40b.

On the other hand, the input shaft 1 and ring gear 26 can be connected to each other through the transmission shaft 28 disposed concentrically with the input shaft 1 in such a manner that the transmission of the rotation power is possible between them. Between the transmission shaft 28 and input shaft 1, there is interposed the high speed clutch 29 in such a manner that it is arranged in series to the two shafts 28, 1. Therefore, when the high speed clutch 29 is connected, the transmission shaft 28 can be rotated in the same direction and at the same speed as the input shaft 1 as the input shaft 1 is rotated.

Also, the continuously variable transmission apparatus shown in FIG. 7 further includes a clutch mechanism which constitutes mode switching means. This clutch mechanism is composed of the high speed clutch 29, a low speed clutch 44 interposed between the outer peripheral edge portion of the carrier 37 and the axial-direction one end portion (in FIG. 7, the right end portion) of the ring gear 26, and a retreat clutch 45 interposed between the ring gear 26 and the fixed portion of the continuously variable transmission apparatus such as a housing (not shown). In the case of these clutches 29, 44, 45, when any one of them is connected, the connection of the remaining two clutches is cut off.

In the case of the above-structured continuously variable transmission apparatus, firstly, in the low speed running operation, not only the low speed clutch 44 is connected but also the connection of the high speed clutch 29 and retreat clutch 45 is cut off. In this state, when the start clutch 32 is connected and the input shaft 1 is rotated, only the toroidal-type continuously variable transmission 24 is allowed to transmit the power from the input shaft 1 to the output shaft 33. In such low speed running operation, the speed ratio between the pair of input side disks 2, 2 and the pair of output side disks 5, 5 may be adjusted similarly to the previously described structure which is shown in FIGS. 4 to 6 and also in which the toroidal-type continuously variable transmission is used singly.

On the other hand, in the high speed running operation, not only the high speed clutch 29 is connected but also the connection of the low speed clutch 44 and retreat clutch 45 is cut off. In this state, in case where the start clutch 32 is connected and the input shaft 1 is rotated, the power is transmitted from the input shaft 1 to the output shaft 33 by the transmission shaft 28 and planetary-gear-type transmission 25. That is, in case where the input shaft 1 is rotated in the high speed running operation, the rotational power of the input shaft 1 is transmitted through the high speed clutch 29 and transmission shaft 28 to the ring gear 26. And, the rotational power of the ring gear 26 is transmitted through the plurality of planetary gears 35, 35 to the sun gear 34, thereby rotating the output shaft 33 with the sun gear 34 fixed thereto. In this state, in case where the speed ratio of the toroidal-type continuously variable transmission 24 is changed to thereby change the revolving speed of the respective planetary gears 35, 35 around the sun gear 34, the speed ratio of the whole of the continuously variable transmission apparatus can be adjusted.

That is, in the above-mentioned high speed running operation, the respective planetary gears 35, 35 are revolved around the sun gear 34 in the same direction as the ring gear 26. And, the slower the revolving speeds of the planetary gears 35, 35 around the sun gear 34 are, the faster the rotation speed of the output shaft 33 with the sun gear 34 fixed thereto is. For example, in case where the revolving speed of the planetary gears 35 around the sun gear 34 and the rotation speeds of the ring gear 26 (both of the speeds are angular speeds) become equal to each other, the rotation speeds of the ring gear 26 and output shaft 33 become equal to each other. On the other hand, in case where the rotation speeds of the planetary gears 35 are slower than the revolving speed of the ring gear 26, the rotation speed of the output shaft 33 is faster than the rotation speed of the ring gear 26. Contrary to this, in case where the rotation speed of the planetary gears 35 is faster than the revolving speed of the ring gear 26, the rotation speed of the output shaft 33 is slower than the rotation speed of the ring gear 26.

Therefore, in the high speed running operation, the more the speed ratio of the toroidal-type continuously variable transmission 24 is changed toward the speed reducing side, the more the speed ratio of the whole of the continuously variable transmission apparatus is changed to the speed increasing side. In such high speed running operation, power (torque) is applied to the toroidal-type continuously variable transmission 24 not from the input side disks 2, 2 but from the output side disk 5 (assuming that a torque to be applied in the low speed operation is a positive torque, a negative torque is applied). That is, in a state where the high speed clutch 29 is connected, the torque transmitted from the engine 30 to the input shaft 1 is transmitted through the transmission shaft 28 to the ring gear 26 of the planetary-gear-type transmission 25. Therefore, there exists little torque which is transmitted to the input side disks 2, 2 from the input shaft 1 side.

On the other hand, part of the torque transmitted through the transmission shaft 28 to the ring gear 26 of the planetary-gear-type transmission 25 is transmitted from the respective planetary gears 35, 35 through the carrier 37 and power transmission mechanism 38 to the respective output side disks 5, 5. The torque to be applied from the output side disks 5, 5 to the toroidal-type continuously variable transmission 24 decreases as the speed ratio of the toroidal-type continuously variable transmission 24 is changed toward the speed reducing side, in order that the speed ratio of the whole of the continuously variable transmission apparatus can be changed to the speed increasing side. As a result of this, the torque to be input to the toroidal-type continuously variable transmission 24 in the high speed running operation decreases. And, in case where the torque to be applied to the toroidal-type continuously variable transmission 24 is small in this manner, the pressing force to be generated by the pressing device 23*a* is reduced to thereby enhance the durability of the composing parts of the toroidal-type continuously variable transmission 24. (U.S. Pat. No. 6,171, 210).

Further, when rotating the output shaft 33 reversely in order to back a car, not only the connection of both of the low speed and high speed clutches 44, 29 is cut off but also the retreat clutch 45 is connected. As a result of this, not only the ring gear 26 is fixed but also the respective planetary gears 35, 35 revolve around the periphery of the sun gear 34 while they are meshingly engaged with the ring gear 26 and sun gear 34. And, the sun gear 34 and output shaft 33 with the sun gear 34 fixed thereto are rotated in the opposite direction to the previously described low speed and high speed running operations.

As the structure of a pressing device used in a toroidal-type continuously variable transmission for securing the surface pressure of the rolling contact portions (traction portions) between the inner surfaces of the input side and output side disks and the peripheral surfaces of the respective power rollers, there are known, besides the structure shown in FIGS. 4, 5 and 7, structures which are disclosed in JP-B-6-72652 and JP-A-2000-65193. Of the two cited publications, JP-B-6-72652 discloses a structure which adjusts oil pressure to be introduced into a pressing device of an oil pressure type by manifold vacuum of the engine and inclined angle of the trunnion as well as a structure which combines together a loading cam and an oil pressure cylinder, allows the loading cam to generate a pressing force corresponding to an input torque, and allows the oil pressure cylinder to generate a pressing force corresponding to a transmission ratio. Also, in JP-A-2000-65193, there is disclosed a structure in which the kinematic viscosity of traction oil is measured using a viscosity sensor and a pressing force to be generated by the pressing device is changed according to the measured kinematic viscosity.

Of the above-mentioned conventional structures, in the case of the structure shown in FIGS. 4 and 5, the pressing force to be generated by the pressing device 23 of a loading cam type is often excessively large, which provides a disadvantage from the viewpoint of securing the durability of the composing parts of the toroidal-type continuously variable transmission 24. That is, for example, as disclosed in the above-cited publication, JP-B-6-72652 or "Motion & Control" NSK Technical Journal No. 10 Apr. 2001, it is conventionally known that the pressing force required of the pressing device 23 varies according to the transmission ratios. On the other hand, the pressing force to be generated by the pressing device 23 of a loading cam type is constant so long as the torque applied to the input portion of the pressing device 23 is the same. Therefore, the pressing device 23 of a loading cam type is designed in such a manner that it can generate the largest pressing force required. In concrete terms, in a case where the transmission ratio requires maximum pressing force, the pressing device is designed as a structure generating the required force. For this reason, in case where the transmission ratio deviates greatly from 1 (that is, in case where a speed increasing ratio or a speed reducing ratio becomes large), the pressing force to be generated by the pressing device 23 is excessively large. The excessive large pressing force is undesirable not only from the viewpoint of reduction in the size of the toroidal-type continuously variable transmission, for securement of transmission efficiency but also from the viewpoint of securing the durability of the composing parts of the toroidal-type continuously variable transmission.

Also, in the case of the structure shown in FIG. 7, consideration is given only to reduction in the oil pressure to be generated by the pressing device 23*a* when the torque passing through the toroidal-type continuously variable transmission 24 in the high speed mode in which the high speed clutch 29 is connected. Therefore, the present structure cannot always provide a sufficient effect from the viewpoint of securement of transmission efficiency and from the viewpoint of securement of durability.

Also, the structure disclosed in JP-B-6-72652 is a structure in which there is generated a pressing force with an input torque and a transmission ratio taken into consideration. However, it is difficult to make such a fine adjustment as to reduce sufficiently a difference between a pressing force required and a pressing force occurring actually.

Further, the structure disclosed in JP-A-2000-65193 is capable of obtaining a pressing force corresponding to the kinematic viscosity of the traction oil. However, the present structure is not able to make a more detailed adjustment. Also, not only it is difficult to measure the kinematic viscosity of the traction portion but also, even in case where such measurement is possible, it is unavoidable that the structure is complicated.

In order to reduce sufficiently the difference between the necessary pressing force and the actually occurring pressing force, that is, in order to make the pressing force to be generated by the pressing device correspond with the minimum pressing force necessary to secure the surface pressure of the traction portion (actually, in order to make the former slightly larger than the latter), it can be expected that the oil pressure to be introduced into the pressing device of an oil pressure type is controlled electrically. In case where the oil pressure is controlled electrically in this manner, regardless of variations in the transmission ratio, the pressing force to be generated by the pressing device can be made slightly larger than the minimum necessary pressing force, thereby being able not only to prevent the surface pressures of the traction portions from being excessively large but also to prevent excessive slippage from occurring in the traction portions.

However, in case where the oil pressure to be introduced into the pressing device of an oil pressure type is controlled purely electrically, when a computer for control is out of order or when a control circuit is out of order due to breaking of a wire, the oil pressure disappears or lowers extremely. As a result of this, the inner surfaces of the input side and output side disks and the peripheral surfaces of the power rollers, which are the composing parts of the toroidal-type continuously variable transmission, slip with respect to each other in their mutual rolling contact portions (that is, the above-mentioned traction portions), thereby causing so called gross slippage which makes it impossible to transmit the power between them. In case where such gross slippage occurs, not only a vehicle carrying the toroidal-type continuously variable transmission becomes unable to run but also the respective surfaces wear excessively, thereby raising a possibility that the toroidal-type continuously variable transmission can be damaged to such a degree that the transmission cannot be repaired. On the other hand, under present conditions, the possibility of an electrical control circuit being out of order is higher than the possibility of a control mechanism of an oil pressure type or a mechanical type being out of order.

Therefore, in case where the oil pressure to be introduced into the pressing device of the above-mentioned oil pressure type is controlled only by the control circuit of a purely electrical type, there arises a problem from the viewpoint of securement of reliability.

SUMMARY OF THE INVENTION

In view of the above-mentioned conventional structures, it is an object of the present invention to provide a structure which can be constructed in a simple manner, can provide proper surface pressures in the traction portions to thereby be able to secure the transmission efficiency and durability of a toroidal-type continuously variable transmission, and, even when disabled, can secure the minimum function.

In attaining the above object, according to the invention, there is provided a toroidal-type continuously variable transmission, has: first and second disks respectively including inner surfaces and disposed so as to be concentric with each other and rotated with respect to each other; a plurality of power rollers interposed between and held by the mutually facing inner surfaces of the first and second disks for transmitting power between the first and second disks; a pressing device of an oil pressure type for pressing the first disk toward the second disk; a main oil pressure control unit for non-electrically detecting the force to be transmitted between the first and second disks, the main oil pressure control setting, as a target value, an oil pressure necessary for the pressing device to generate a pressing force necessary when a transmission ratio between the first and second disks is a transmission ratio requiring a maximum pressing force, and increase the target value as the pressing force increases; and, an oil pressure correcting apparatus for electrically finding a necessary value of the oil pressure, the necessary value corresponding to the optimum value of such pressing force to be generated by the pressing device as to vary according to the transmission ratio between the first and second disks, and also for introducing an oil pressure of a value into the pressing device, the oil pressure of the value being obtained by subtracting a correction value, which is a difference between the necessary value and the target value, from the target value.

Also, according to the invention, the toroidal-type continuously variable transmission may have: a support member swingable and shiftable about a pivot shaft in transmission with the power rollers rotatably supported; and, an actuator of an oil pressure type including a cylinder and a piston fitted into the cylinder and shifting the support member in the axial direction of the pivot shaft in accordance with supply and exclusion of the pressure oil, wherein the force to be transmitted between the first and second disks is detected in accordance with a difference between oil pressures in a pair of oil pressure chambers existing within the cylinder on the two sides of the axial direction of the piston.

Further, according to the invention, an operation device constituting the oil pressure correcting apparatus finds a correction signal according to the transmission ratio and the temperature of lubricating oil existing in the interior of the toroidal-type continuously variable transmission and the rotation speed of a drive source, and, in accordance with the correction signal, the correction value of the oil pressure is obtained by opening and closing an electromagnetic valve in accordance with the correction signal.

[Operation]

In the case of the above-structured toroidal-type continuously variable transmission according to the invention, the pressing force to be generated by the pressing device is adjusted by the force (power) passing through the toroidal-type continuously variable transmission and the transmission ratio thereof; and, therefore, regardless of the operating states of the toroidal-type continuously variable transmission, the pressing force can be controlled to the optimum value. That is, the oil pressure to be introduced into the pressing device by the oil pressure correct device is set at a value obtained by subtracting a correction value from a target value set by a main oil pressure control unit, that is, a necessary value which varies according to a transmission ratio between the first and second disks and corresponds to the optimum value of the pressing force to be generated by the pressing device of the necessary value, the correction value can be obtained electrically and, therefore, the oil pressure to be introduced into the pressing device can be fine adjusted according to the operating states of the toroidal-type continuously variable transmission. As a result of this, the surface pressure of the traction portions can be set at a proper value, which makes it possible to secure the transmission efficiency and durability of the toroidal-type continuously variable transmission.

Also, in case where an electric circuit for obtaining the necessary value is out of order, the oil pressure correct device is unable to calculate the correction value, while the oil pressure of a target value set by the main oil pressure control unit is introduced into the pressing device. The target value exceeds the necessary value when the transmission ratio between the first and second disks is a speed reducing side or a speed increasing side. In other words, when the transmission ratio is the speed reducing side or the speed increasing side, the pressing force to be generated by the pressing device is excessively large. However, the pressing force to be generated in this case, in the first example of the conventional structures shown in the previously described FIGS. 4 to 6, corresponds to the pressing force that is generated by the pressing device 23 of a loading cam type. Therefore, the transmission efficiency and durability of the toroidal-type continuously variable transmission are lowered slightly, while the necessary minimum function can be secured. Thanks to this, not only a vehicle carrying the above-mentioned toroidal-type continuously variable transmission can be made to run by itself to a repair shop but also the inner surfaces of the first and second disks and the peripheral surfaces of the power rollers can be prevented against heavy damage.

Also, in case where the power to be transmitted between the first and second disks is detected in accordance with a difference between the values of oil pressures in a pair of oil pressure chambers formed in a cylinder portion constituting an actuator of an oil pressure type for shifting support members supporting the power rollers in the axial direction of their associated pivot shafts, the present power can be detected highly efficiently with a simple structure.

Further, in case where a correction signal is obtained while not only the transmission ratio but also the temperature of lubricating oil existing in the interior of the toroidal-type continuously variable transmission and the rotation speed of the drive source are taken into consideration, and the correction value of the oil pressure is obtained by opening and closing an electromagnetic valve in accordance with the thus-obtained correction signal, the surface pressures of the traction portions in the normal time (in the trouble-free time) can be set at more proper values and thus the transmission efficiency and durability of the toroidal-type continuously variable transmission can be secured more effectively.

DETAILED DESCRIPTION OF THE PREFERRED EMBODIMENTS

Figure 1:
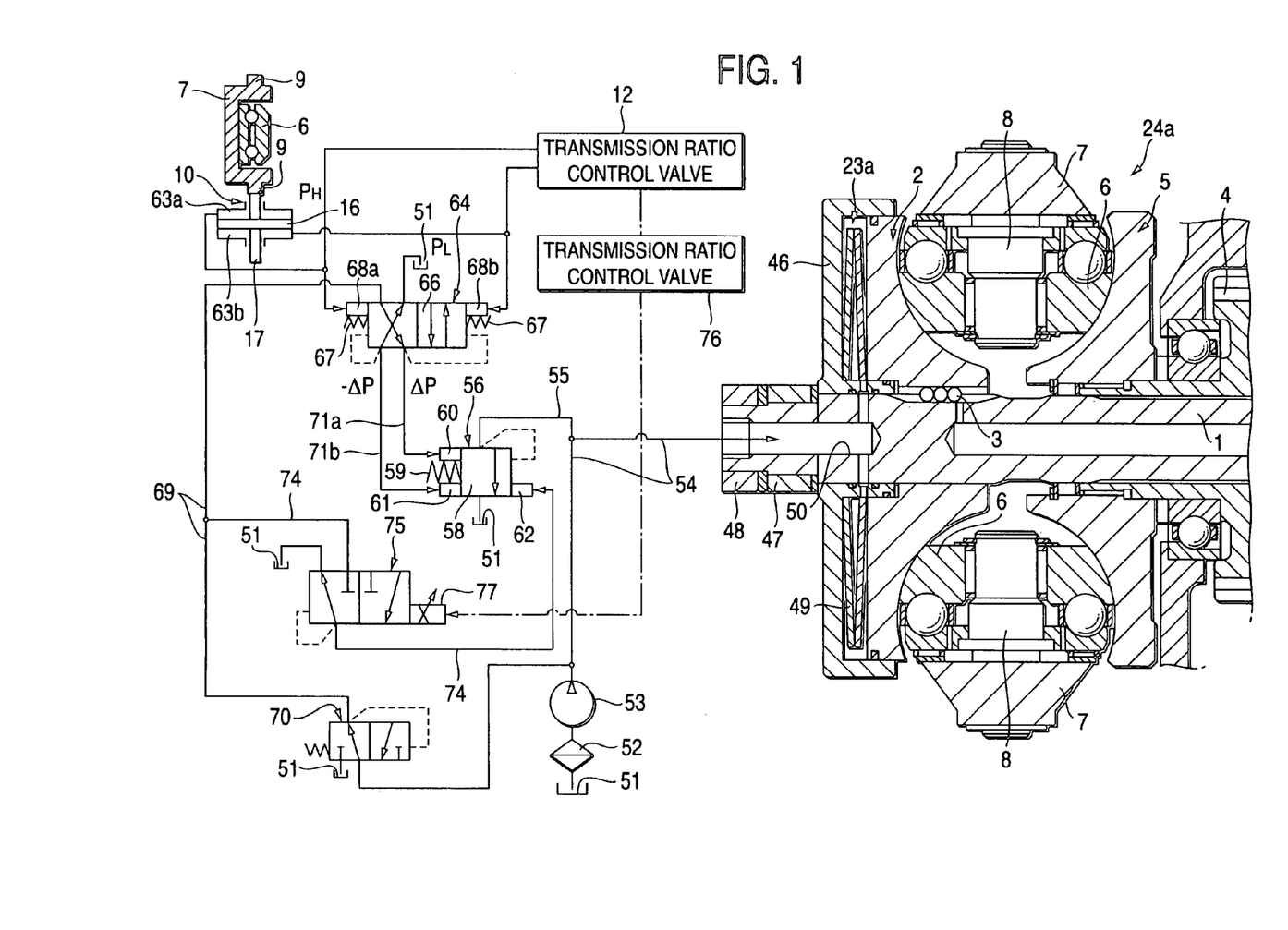
FIG. 1 is a partial section view of an embodiment of a toroidal-type continuously variable transmission according to the invention.
Figure 2:
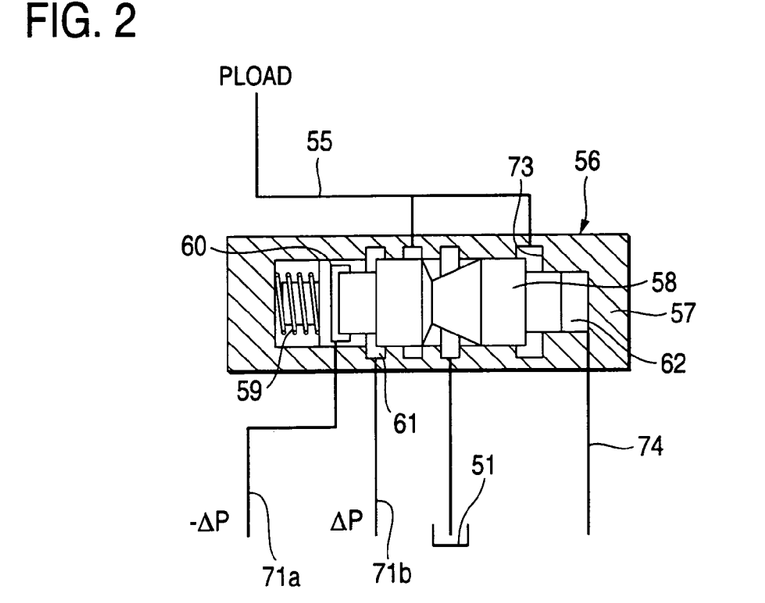
FIG. 2 is a section view of a pressing force control valve.
Figure 3:
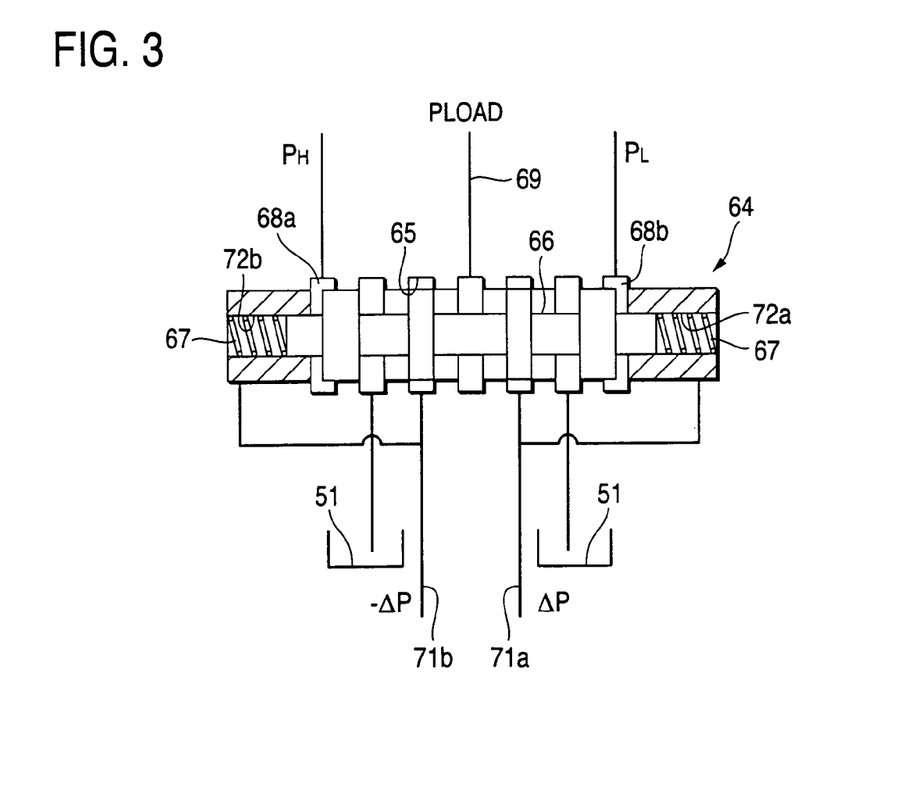
FIG. 3 is a section view of a pressure difference take-out valve.

Now, FIGS. 1 to 3 show an embodiment of a toroidal-type continuously variable transmission according to the invention. By the way, the invention is characterized by the structure of such portion of the toroidal-type continuously variable transmission that can set proper the surface pressures of the rolling contact portions between the inner surfaces of input side and output side disks, 2, 5 and the peripheral surfaces of power rollers 6, 6, that is, the traction portions. The structure of a toroidal-type continuously variable transmission 24a itself is similar to the first example of the conventional structures shown in the previously described FIGS. 4 to 6 except that, as a pressing device 23a, there is used a pressing device of an oil pressure type. Therefore, illustration and description of the equivalent parts are omitted or simplified here. Thus, description will be given mainly of the characteristic portions of the invention. By the way, in FIG. 1, the oil pressure transmission route of an oil pressure circuit is drawn by a solid line, while the signal transmission route of an electric circuit is drawn by a one-dot chained line.

A cylinder 46, which has a U-shaped section and is formed in a circular ring shape as a whole, is fitted with the outer surface of one end portion (in FIG. 1, the left end portion) of an input shaft 1 constituting the above-mentioned toroidal-type continuously variable transmission 24a and is held by a spacer 47 and a loading nut 48 to thereby prevent the cylinder 46 from being removed from the input shaft 1. And, the outer half section (in FIG. 1, the left half section) of the input side disk 2 is oil-tight fitted into the cylinder 46, thereby constituting the pressing device 23a of an oil pressure type. By the way, between the bottom plate portion of the cylinder 46 and the outer surface of the input side disk 2, there is interposed a pre-load spring 49 such as a coned plate spring. This pre-load spring 49 is disposed in order to apply the necessary minimum surface pressure to the traction portions. Also, pressure oil can be supplied into the pressing device 23a through an oil supply passage 50 formed in one end portion of the input shaft 1 and cylinder 46. That is, the pressure oil, which is sucked through a filter 52 from an oil tank portion 51 disposed in a portion of a casing (not shown) with the toroidal-type continuously variable transmission 24a stored therein and is then jetted out from a pressure oil pump 53, can be fed into the oil supply passage 50 through a first pressure introduction passage 54.

According to the present embodiment, one end portion of a pressure escape passage 55 is connected to the intermediate portion of the first pressure introduction passage 54, while the other end portion of the pressure escape passage 55 is allowed to communicate with the oil tank portion 51. And, a pressing force control valve 56 is disposed on the intermediate portion of the pressure escape passage 55 in such a manner that the pressing force control valve 56 is connected in series to the pressure escape passage 55. The pressing force control valve 56 has the function of a relief valve and, as can be seen from the concrete structure of the pressing force control valve 56 shown in FIG. 2, the pressing force control valve 56 is structured such that a spool 58 fitted into a casing 57 so as to be shiftable in the axial direction is energized by a spring 59. Also, the pressing force control valve 56 includes first to third pilot portions 60 to 62. Of these three pilot portions, the first and second pilot portions 60, 61 are used to adjust the valve opening pressure of the pressing force control valve 56 according to the size of the force that is transmitted between the input side disk 2 and output side disk 5. On the other hand, the third pilot portion 62 is used to adjust the valve opening pressure of the pressing force control valve 56 according to the transmission ratio of the toroidal-type continuously variable transmission 24a, the temperature of lubricating oil (traction oil) existing in the interior of the toroidal-type continuously variable transmission 24a; and other operating conditions than the above-mentioned force such as the rotation speed of an engine serving as a drive source. In the present embodiment, by properly adjusting the oil pressure to be introduced into the first to third pilot portions 60 to 62, the pressing force to be generated by the pressing device 23a can be restricted properly according to the operating conditions of the toroidal-type continuously variable transmission 24a.

Firstly, description will be given below of the portion that restricts the oil pressure to be introduced into the first and second pilot portions 60 and 61 according to the size of the above-mentioned force. In the present embodiment, as the oil pressure to be introduced into any one of the first and second pilot portions 60, 61 increases, the valve opening pressure of the pressing force control valve 56 increases and the oil pressure to be introduced into the cylinder 46 constituting the pressing device 23a increases. For this purpose, in the present embodiment, a pressure difference between a pair of oil pressure chambers 63a, 63b disposed in an actuator 10 for shifting a trunnion 7 in the axial direction of its associated pivot shafts 9, 9 with a piston 16 between them can be introduced into any one of the pilot portions 60, 61. By the way, the pressure receiving areas of the first and second pilot portions 60, 61 are set equal to each other, so that, regardless of the transmission directions of the force, the size of the force pressing the spool 58 of the pressing force control valve 56 to the right in FIGS. 1 and 2 can be maintained constant so long as the force passing through the toroidal-type continuously variable transmission 24a is the same.

To the pair of oil pressure chambers 63a, 63b, similarly to the previously described conventional structure, there can be supplied the pressure oil through a transmission ratio control valve 12. A sleeve 14 (see FIG. 6) constituting the transmission ratio control valve 12 is shifted in the axial direction by a stepping motor 13 (see FIG. 6) in accordance with an instruction signal from a transmission control unit 76 with a built-in microcomputer. As has been previously described, the size |ΔP| of the pressure difference ±ΔP between the pair of oil pressure chambers 63a, 63b into which the oil pressure is introduced through such transmission ratio control valve 12 is in proportion to the force that passes through the toroidal-type continuously variable transmission 24a. By the way, in the case of the above-mentioned pressure difference, a mark + means a case in which, as the power is transmitted from the engine to the drive wheels, the trunnion 7 shown on the upper left portion in FIG. 1 is pulled upwardly; and, − means a case in which, with operation of engine braking caused by speed reduction, the trunnion 7 is pushed downwardly.

At any rate, in the present embodiment, the pressure difference ±ΔP is taken out by a pressure difference take-out valve 64 and is then introduced into any one of the first and second pilot portions 60, 61. Here, FIG. 3 shows the concrete structure of the pressure difference take-out valve 64. That is, as shown in FIG. 3, in the pressure difference take-out valve 64, a pair of springs 67, 67 and a pair of pilot portions 68a, 68b are respectively disposed with a spool 66 between them, while the spool 66 is fitted into a cylinder hole 65 including a small-diameter portion and a large-diameter portion arranged alternately in such a manner that the spool 66 can be shifted in the axial direction. The spool 66 includes a plurality of collar portions which can be oil-tight fitted with the small-diameter portion of the cylinder hole 65. And, the downstream end of the second pressure introduction passage 69 is opened in the interior of the large-diameter portion that exists in the central portion of the cylinder hole 65. Also, the upstream end of the second pressure introduction passage 69 is connected to the jet-out opening of the pressure oil pump 63 and, on the middle portion of the second pressure introduction passage 69, there is disposed a pressure reducing valve 70 in such a manner that the pressure reducing valve 70 is connected in series to the second pressure introduction passage 69.

The spool 66 constituting the pressure difference take-out valve 64 can be shifted in the axial direction according to such pressure in the interior of the pair of oil pressure chambers 63a, 63b disposed in the actuator 10 with a piston 16 between them that is introduced into the pair of pilot portions 68a, 68b. And, the spool 66 controls the communication state between the downstream end of the second pressure introduction passage 69 and the first and second pilot portions 60, 61 belonging to the pressing force control valve 56. That is, the spool 66 constituting the pressure difference take-out valve 64 is shifted in the axial direction according to the difference between the oil pressures that are respectively introduced into the pair of pilot portions 68a, 68b. Depending on whether the oil pressure introduced into one 68a (68b) of the two pilot portions is higher than the oil pressure introduced into the other 68b (68a) of the two pilot portions or not, the oil pressure is introduced into third pressure introduction passages 71a (71b) with their respective one end portions (in FIG. 1, the upper left end portions) connected to the pressure difference take-out valve 64, or into reaction force chambers 72a (72b) respectively disposed in the portions of the pressure difference take-out valve 64 that are opposed to the two end faces of the spool 66.

For example, when the toroidal-type continuously variable transmission transmits the power from the drive source to the drive wheels, the oil pressure in the interior of the oil pressure chamber 63a of the actuator 10 becomes higher than that of the other oil pressure chamber 63b. In this state, the oil pressure to be introduced into the pilot portion 68a becomes higher than the oil pressure to be introduced into the other pilot portion 68b and thus the spool 66 is moved to the right in FIGS. 1 and 3, so that the pressure difference take-out valve 64 is switched over to the state shown in FIG. 1. As a result of this, the pressure oil fed through the second pressure introduction passage 69 is introduced through one (in FIG. 1, the lower right one) 71a of the third pressure introduction passages into the first pilot portion 60 of the pressing force control valve 56. On the other hand, in the engine braking operation, oppositely, the oil pressure to be introduced into the other pilot portion 68b becomes higher than the oil pressure to be introduced into the pilot portion 68a and thus the spool 66 is moved to the left in FIGS. 1 and 3, so that the pressure difference take-out valve 64 is switched over to the reversed state to the state shown in FIG. 1. As a result of this, the pressure oil fed through the second pressure introduction passage 69 is introduced through the other (in FIG. 1, the lower left passage) 71b of the third pressure introduction passages into the second pilot portion 61 of the pressure difference take-out valve 56.

In both cases, the pressure oil introduced into the third pressure introduction passages 71a, 71b is also introduced into the reaction force chambers 72a (72b) of the pressure difference take-out valve 64 to thereby press against the axial-direction end face of the spool 66. Therefore, the force, which shifts the spool 66 in the axial direction to thereby allow the second pressure introduction passage 69 and the third pressure introduction passage 71a (71b) to communicate with each other, is in proportion to the difference |ΔP| between the oil pressures introduced into the pair of pilot portions 68a, 68b disposed in the pressure difference take-out valve 64. As a result of this, the oil pressures to be introduced into the first and second pilot portions 60, 61 of the pressing force control valve 56 are in proportion to the difference |ΔP| between the oil pressures in the oil pressure chambers 63a, 63b of the actuator 10, that is, the force that passes through the toroidal-type continuously variable transmission 24a.

The valve opening pressure of the pressing force control valve 56 increases as the oil pressures introduced into the first and second pilot portions 60, 61 increase, while the oil pressure to be introduced through the first pressure introduction passage 54 into the pressing device 23a increases as the valve opening pressure of the pressing force control valve 56 increases. Therefore, the oil pressure to be introduced into the pressing device 23a and thus the pressing force to be generated by the pressing device 23a increase as the force passing through the toroidal-type continuously variable transmission 24a increases. Thus, the value of the pressing force to be generated by the pressing device 23a is a value which is necessary when the transmission ratio of the toroidal-type continuously variable transmission 24a is 1, while the oil pressure necessary for this is a target value set forth in claim 1. The foregoing description relates mainly to the structure and operation of the main oil pressure control unit.

Further, in the case of the present structure, as an oil pressure correcting apparatus, there are disposed, in addition to the third pilot portion 62 incorporated into the pressing force control valve 56, a fourth pressure introduction passage 74 and an electromagnetic valve 75. Of these parts, the fourth pressure introduction passage 74 allows the second pressure introduction passage 69 to communicate with the third pilot portion 62. Also, the electromagnetic valve 75 is disposed in the intermediate portion of the fourth pressure introduction passage 74 in such a manner that the former is connected in series to the latter. And, the electromagnetic valve 75 is capable of switching the following two states at a high speed over to each other when it is operated by a solenoid 77 which can be controlled with an instruction given from the transmission control unit 76: that is, one of the states allowing the second pressure introduction passage 69 and third pilot portion 62 to communicate with each other, and the other state allowing the third pilot portion 63 and oil storage portion 51 over to each other. Therefore, the oil pressure to be introduced into the third pilot portion 62 can be adjusted arbitrarily and finely according to the instruction from the transmission control unit 76. That is, the transmission control unit 76 finds electrically the necessary value of the oil pressure corresponding to the optimum value of the pressing force to be generated by the pressing device 23a with the transmission ratio of the toroidal-type continuously variable transmission 24a, the temperature of lubricating oil existing in the interior of the toroidal-type continuously variable transmission 24a, the rotation speed of the engine serving as the drive source and the like taken into consideration And, the transmission control unit 76 then introduces the oil pressure corresponding to a correction value, which is a difference between the necessary value and the above-mentioned target value, into the third pilot portion 62.

The oil pressure introduced into the third pilot portion 62 in this manner presses against the spool 58 of the pressing force control valve 56 to the left in FIGS. 1 and 2. As a result of this, the flow passage of the pressing force control valve 56 is opened, which provides a tendency to allow the pressure escape passage 55 and oil storage portion 51 to communicate with each other. That is, when the oil pressure introduced from the pressure escape passage 55 into the pressure chamber 73 increases, the flow passage of the pressing force control valve 56 is opened to thereby lower the oil pressure in the pressure escape passage 55 and first pressure introduction passage 54. Thus, the valve opening pressure $P_{56}$ of the pressing force control valve 56 is in proportion to a value obtained by subtracting a force $F_2$ based on the oil pressure introduced into the third pilot portion 62 from the sum of the elastic force $F_{59}$ of the spring 59 built into the pressing force control valve 56 and a force $F_1$ based on the oil pressure introduced into any one of the first and second pilot portions 60, 61 $P_{56} \propto F_{59} + F_1 - F_2$. Here, the elastic force $F_{59}$ of the spring 59 is constant, and the force $F_1$ based on the oil pressure introduced into any one of the first and second pilot portions 60 and 61, as described before, increases as the force passing through the toroidal-type continuously variable transmission 24a increases. Also, the force $F_2$ based on the oil pressure introduced into the third pilot portion 62 is fine adjusted according to the operating conditions of the toroidal-type continuously variable transmission 24a such as the transmission ratio and oil temperature thereof by the transmission control unit 76. Specifically, as the deviation of the transmission ratio from 1 increases and as the oil temperature decreases, the oil pressure to be introduced into the third pilot portion 62 is increased and the force $F_2$ is increased.

In the case of the above-structured toroidal-type continuously variable transmission according to the present embodiment, the pressing force generated by the pressing device 23a is adjusted according to the force passing through the toroidal-type continuously variable transmission 24a. In this case, the structure has a mechanism adjusting the pressing force in response to a transmission ratio setting the pressing force into maximum. In addition to this, the structure also has a second mechanism adjusting the pressing force generated by the pressing device 23a in response to the transmission ratio and oil temperature. Therefore, the structure controls the optimum pressing force. The present pressing force can be restricted to the optimum value regardless of the operating conditions of the toroidal-type continuously variable transmission 24a. That is, as the valve opening pressure of the pressing force control valve 56 constituting the oil pressure correcting apparatus is adjusted in the above-mentioned manner, the oil pressure to be introduced into the pressing device 23a provides the necessary value $P_{56}(\propto F_{59} + F_1 - F_2)$ which is in proportion to a value obtained by subtracting a correction value, that is, the force $F_2$ based on the oil pressure introduced into the third pilot portion 62 from the target value set by the pressure difference take-out valve 64 constituting the main oil pressure control unit, that is, the sum $(F_{59} + F_1)$ of the elastic force $F_{59}$ and the force $F_1$ based on the oil pressure. Of the necessary value, since the correction value $F_2$ can be found electrically, the oil pressure to be introduced into the pressing device 23a can be fine adjusted according to the operating conditions of the toroidal-type continuously variable transmission 24a. As a result of this, the surface pressures of the traction portions can be set properly, which makes it possible to secure the transmission efficiency and durability of the toroidal-type continuously variable transmission 24a.

Also, in case where the operation portion of the oil pressure correcting apparatus disposed in the transmission control unit 76 is disabled to calculate the correction value $F_2$ of the necessary value $P_{56}$ because an electric circuit for finding the correction value $F_2$ is out of order, into the pressing device 23a, there is introduced an oil pressure having the target value $(\propto F_{59} + F_1)$ set by the pressure difference take-out valve 64 constituting the main oil pressure control unit. This target value exceeds the above-mentioned necessary value when the transmission ratio of the toroidal-type continuously variable transmission 24a is the speed decreasing side or the speed increasing side. In other words, when the transmission ratio is the speed decreasing side or the speed increasing side, the pressing force to be generated by the pressing device 23a is excessively large. However, the pressing force to be generated in this case, in the first example of the conventional structures shown in FIGS. 4 to 6, corresponds to the pressing force to be generated by the pressing device 23 of a loading cam type. Therefore, while the transmission efficiency and durability of the toroidal-type continuously variable transmission 24a are slightly lowered, the necessary minimum function can be secured. Thanks to this, not only a vehicle carrying the toroidal-type continuously variable transmission 24a is allowed to run by itself to a repair shop but also the inner surfaces of the input side and output side disks 2, 5 and the peripheral surfaces of the power rollers 6, 6 can be prevented from being damaged heavily. Thus, in case where the oil pressure correcting apparatus, which is easier to be out of order due to its complicated structure than the above-mentioned main oil pressure control unit for setting a pressing force in a pure oil pressure manner, is out of order, the reliability of the toroidal-type continuously variable transmission 24a can be secured.

By the way, according to the invention, even in case where the oil pressure correcting apparatus is out of order, the running operation of a vehicle carrying the toroidal-type continuously variable transmission 24a thereon can be continued without giving a strange feeling to the driver of the vehicle specially. However, in case where such condition is left as it is, the transmission efficiency is lowered to thereby worsen the mileage performance and running performance of the vehicle; and, in case where the oil pressure correcting apparatus is left unrepaired for an excessively long period of time, the durability of the toroidal-type continuously variable transmission 24a can also be impaired. Therefore, when the oil pressure correcting apparatus is out of order, preferably, it may be repaired early. For this purpose, when enforcing the invention, preferably, proper alarm means such as an alarm light for informing the driver that the oil pressure correcting apparatus is out of order may be installed on the dashboard or the like which is disposed on the driver's seat.

Also, the invention can also apply to such structure as shown in FIG. 7 in which the toroidal-type continuously variable transmission 24a is combined with the planetary-gear-type transmission 25 to thereby constitute a continuously variable transmission apparatus. In this case, the oil pressure control unit changes the oil pressure to be fed into the pressing device also according to a mode which is realized as the mode switching means is switched.

That is, in the high speed mode in which the high speed clutch 29 serving as the mode switching means is connected and the low speed and retreat clutches 44, 45 are disconnected, the force passing through the toroidal-type continuously variable transmission 24a is lowered. Therefore, in the high speed mode, the oil pressure to be fed into the pressing device 23a is set lower than the oil pressures in the other modes (low speed and retreat modes). By changing the oil pressure according to the modes, in any one of the modes, the surface pressures of the traction portions can be set properly By the way, in this case, an operation to adjust the oil pressure to be fed into the pressing device 23a according to the variations in the above force is carried out by the main oil pressure control unit.

Since the invention is structured and operates in the above-mentioned manner, there can be realized a toroidal-type continuously variable transmission which is compact in size and is excellent in transmission efficiency and durability.

What is claimed is:

1. A toroidal-type continuously variable transmission comprising:
    first and second disks respectively including inner surfaces and disposed so as to be concentric with each other;
    a plurality of power rollers which are interposed between and held by the mutually facing inner surface of the first and second disks and transmits force between the first and second disks;
    a support member swingable and shiftable about a pivot shaft in transmission with the power rollers rotatably supported;
    an actuator of an oil pressure type including a cylinder, a piston and a pair of oil pressure chambers separated by the piston, and which shifts the support member in the axial direction of the pivot shaft in accordance with supply and exclusion of the pressure oil in the pair of oil pressure chambers;
    a pressing device pressing the first disk toward the second disk in accordance with a pressing oil pressure;
    a control unit that electrically finds an optimum value of a pressing force to be generated by the pressing device according to the transmission ratio between the first and second disks;
    a first valve into which pressures in the pair of pressure chambers are inputted and which outputs a differential pressure in accordance with a difference between the pressure in the pair of pressure chambers;
    a correction valve which outputs a correction pressure determined in accordance with the optimum value found by the control unit; and
    a second valve into which the differential pressure outputted from the first valve and the correction pressure outputted from the correction valve, and which introduces, into the pressing device, the pressing oil pressure in accordance with the input.

2. A toroidal-type continuously variable transmission, comprising:
    first and second disks respectively including inner surfaces and disposed so as to be concentric with each other and rotated with respect to each other;
    a plurality of power rollers which are interposed between and held by the mutually facing inner surfaces of the first and second disks and which transmits force between the first and second disks;
    a support member swingable and shiftable about a pivot shaft in transmission with the power rollers rotatably supported;
    an actuator of an oil pressure type including a cylinder, a piston and a pair of oil pressure chambers separated by the piston. and which shifts the support member in the axial direction of the pivot shaft in accordance with supply and exclusion of the pressure oil in the pair of oil pressure chambers;
    a pressing device of an oil pressure type which presses the first disk toward the second disk by a pressing force;
    a main oil pressure control unit which:
    non-electrically detects a difference between oil pressures in the pair of oil pressure chambers, and
    sets an oil pressure as a target value of the pressing force of the pressing device in accordance with the difference between the oil pressures in the pair of pressure chambers, the oil pressure being necessary for the pressing device to generate a pressing force necessary when a transmission ratio between the first and second disks is a transmission ratio requiring a maximum pressing force, and increasing the target value as the pressing force increases; and
    an oil pressure correcting apparatus which:
    electrically finds a necessary value of the oil pressure, the necessary value corresponding to the optimum value of the pressing force to be generated by the pressing device as to vary according to the transmission ratio between the first and second disks,
    introduces into the pressing device an oil pressure of a value obtained by subtracting a correction value, which is a difference between the necessary value and the target value, from the target value.

3. A toroidal-type continuously variable transmission as set forth in claim 2, wherein an operation device constituting the oil pressure correcting apparatus finds a correction signal according to the transmission ratio and the temperature of lubricating oil existing in the interior of the toroidal-type continuously variable transmission and the rotation speed of a drive source, and, in accordance with the correction signal, the correction value of the oil pressure is obtained by opening and closing an electromagnetic valve in accordance with the correction signal.

4. A toroidal-type continuously variable transmission as set forth in claim 2,
    wherein the main oil pressure control unit comprises a first valve that outputs a differential pressure in accordance with the difference between the oil pressures in the pair of oil pressure chambers, and wherein the main oil pressure control unit sets the oil pressure as the target value in accordance with the outputted differential pressure.

5. A toroidal-type continuously variable transmission as set forth in claim 4,
wherein the oil pressures in the pair of oil pressure chambers are inputted into the first valve and the first valve outputs the differential pressure in accordance with the difference between the oil pressure in the pair of oil pressure chambers.

6. A toroidal-type continuously variable transmission as set forth in claim 4,
wherein the oil pressure correcting apparatus comprises a second valve into which the differential pressure and a pressure in accordance with the correction value are inputted and which introduce the oil pressure of the value into the pressing device.

* * * * *